United States Patent
Faxon

[15] 3,673,538
[45] June 27, 1972

[54] COMPOSITE THERMISTOR TEMPERATURE SENSOR HAVING STEP-FUNCTION RESPONSE

[72] Inventor: Robert C. Faxon, Attleboro, Mass.
[73] Assignee: Texas Instruments Incorporated, Dallas, Tex.
[22] Filed: Dec. 5, 1969
[21] Appl. No.: 882,799

[52] U.S. Cl.................................338/25, 317/41, 323/69, 338/22
[51] Int. Cl..............................................H01c 7/02
[58] Field of Search.........................338/22, 23, 25; 317/41; 323/68, 69

[56] References Cited

UNITED STATES PATENTS

| | | | |
|---|---|---|---|
| 3,365,618 | 1/1968 | Obenhaus | 338/22 X |
| 3,444,399 | 5/1969 | Jones | 338/22 X |
| 3,404,313 | 11/1968 | Happel et al | 317/41 |
| 3,316,765 | 5/1967 | Trolander et al. | 73/362 |

Primary Examiner—Rodney D. Bennett, Jr.
Assistant Examiner—R. Kinberg
Attorney—Harold Levine, Edward J. Connors, Jr., John A. Haug, James P. McAndrews and Gerald B. Epstein

[57] ABSTRACT

A temperature sensor including first and second PTC thermistor elements each having a well-defined transition temperature above which the resistance of the element rises relatively abruptly and below which it changes relatively little, the transition temperature of the second element being substantially greater than that of the first element. The thermistor elements are substantially identically thermally responsive to a body whose temperature is sensed by the sensor. The elements are electrically interconnected to cause the sensor resistance to be an equivalent resistance which varies as a function of the resistance of the elements and changes relatively abruptly at temperatures determined by the transition temperatures of the elements thereby providing the sensor with a step-function R vs. T characteristic.

7 Claims, 13 Drawing Figures

Robert C. Faxon
Inventor

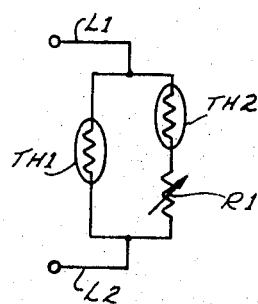
FIG. 4
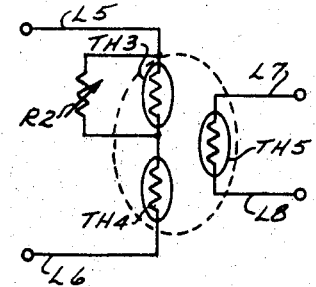
FIG. 5
FIG. 6
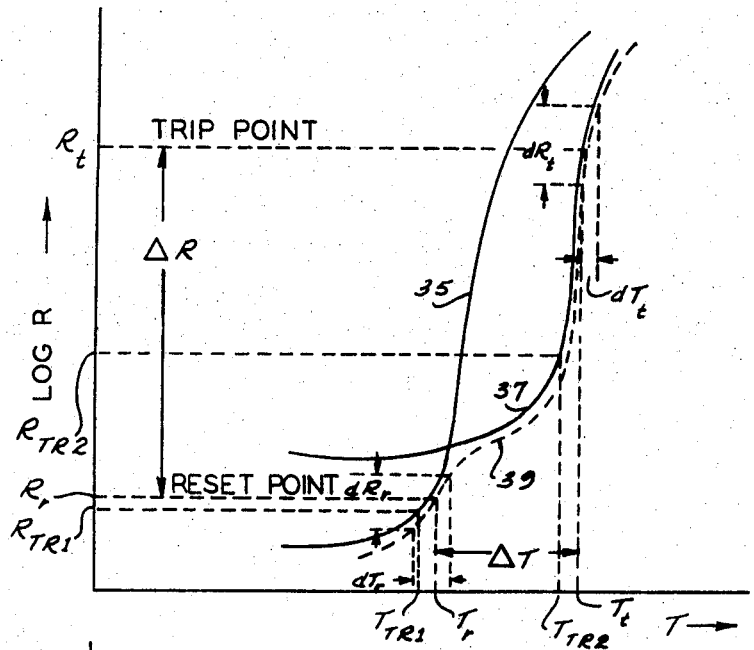
FIG. 8
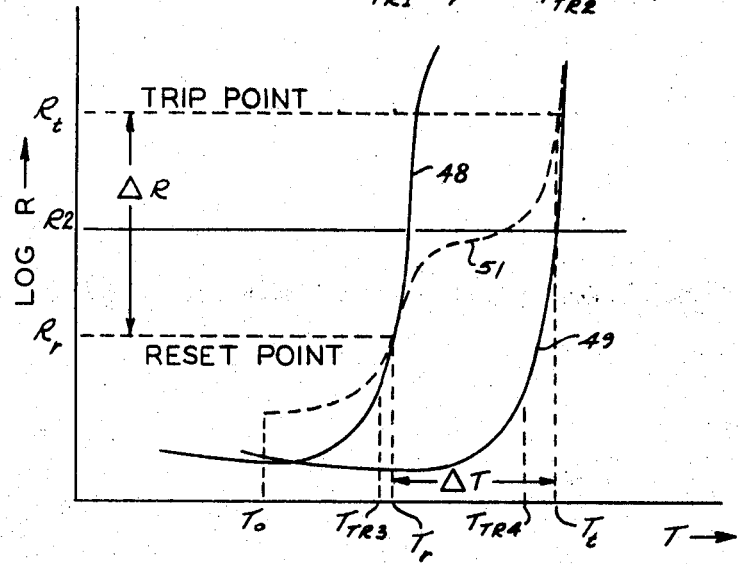

COMPOSITE THERMISTOR TEMPERATURE SENSOR HAVING STEP-FUNCTION RESPONSE

This invention relates to temperature sensors and more particularly to temperature sensors employing thermistor elements and useful in control circuits adapted to perform control functions in response to changes in the resistance of the sensor.

Heretofore, numerous applications have been proposed wherein control circuits employ thermistors for temperature sensing, the control circuits typically performing control functions in response to changes in the temperature of the thermistors. Such control functions may be, for example, the tripping and resetting functions of deenergizing an electric load when the temperature thereof exceeds an upper temperature limit, i.e., a trip temperature, and reenergizing of the load when the temperature thereof falls below a lower temperature limit, i.e., a reset temperature. As a further example, electrothermal furnace controls have been proposed wherein thermistors are employed in an electrothermal timing role for controlling the timing of furnace burner ignition.

In each of the aforesaid types of control circuits, control functions are generally carried out in response to changes in the temperature of a thermistor at control temperatures sensed by, and thus determined by, the thermistor. In order to achieve large changes in resistance for relatively narrower temperature ranges, controls of the above type typically have employed individual thermistors having a nonlinear resistance vs. temperature characteristic exhibiting a positive temperature coefficient (PTC) of resistivity. There are several problems attendant with foregoing prior art thermistor sensor applications which are specifically discussed hereinbelow. In general, among these problems are the following: Such prior art arrangements give rise to errors in the temperatures at which the control functions are carried out; precision control circuits are generally required to effectively reduce such errors; precise tailoring of the control circuit to a particular thermistor may be required; and the temperature differential between temperatures at which control functions are carried out is determined largely by the control circuit rather than the thermistor.

Among the several objects of the invention may be noted the provision of a thermistor temperature sensor employing first and second thermistor elements to provide a composite sensor; the provision of such a composite thermistor temperature sensor for use in a control circuit adapted to perform control functions in response to changes in the resistance of the sensor; the provision of such a composite thermistor temperature sensor which when used in such a control circuit provides high accuracy and thus minimizes error in the control temperatures at which control functions are carried out; the provision of such a composite thermistor sensor which does not require a precision control circuit; the provision of such a composite thermistor sensor which does not require precise tailoring of the control circuit to the thermistor; the provision of such a composite thermistor sensor which is self-determinative of the control temperatures at which control functions are carried out by a control circuit employing the sensor; the provision of such a composite thermistor temperature sensor whose resistance changes relatively abruptly at control temperatures determined by the sensor; the provision of such a composite thermistor temperature sensor having a distinct step-function resistance vs. temperature characteristic; and the provision of such a composite thermistor temperature sensor which is relatively simple and is easily and economically manufactured. Other objects will be in part apparent and in part pointed out hereinafter.

Briefly, a thermistor temperature sensor of the present invention is of the type which is useful in a control circuit adapted to perform first and second control functions in response to changes in the resistance of the sensor at respective first and second control temperatures sensed thereby, and involves the provision of a sensor having first and second thermistor elements. Each of the elements has a positive temperature coefficient of resistivity and a well-defined transition temperature above which the resistance thereof rises relatively abruptly and below which the resistance thereof changes relatively little, the transition temperature of the second element being substantially greater than that of the first element. The elements are substantially identically thermally responsive to a source of heat. The elements are electrically interconnected to provide a composite sensor whose resistance is an equivalent resistance which varies as a function of the resistances of each of the elements and changes relatively abruptly at the control temperatures, thus giving the sensor a step-function response. The transition temperatures of the elements determine the first and second control temperatures.

The invention accordingly comprises the constructions hereinafter described, the scope of the invention being indicated in the following claims.

In the accompanying drawings, in which several of various possible embodiments of the invention are illustrated, FIG. 1 is a graph of a resistance vs. temperature characteristic of a first type of prior art thermistor sensor;

FIG. 4 is a circuit schematic diagram of an alternate embodiment of a composite thermistor sensor of the invention for use with a control circuit like that represented in FIG. 3;

FIG. 5 is a circuit schematic diagram of an alternative interconnection of thermistor elements in accordance with the present disclosure;

FIG. 6 is a graph illustrating the resistance vs. temperature characteristics of individual thermistor elements, together with the equivalent resistance vs. temperature characteristic of a sensor having these thermistor elements interconnected as in FIG. 3;

FIG. 8 is a graph of the resistance vs. temperature characteristics of individual thermistor elements and the equivalent resistance vs. temperature characteristic of a composite sensor having these thermistor elements interconnected as in FIG. 5;

Corresponding reference characters indicate corresponding parts throughout the several views of the drawings.

Figure 1:
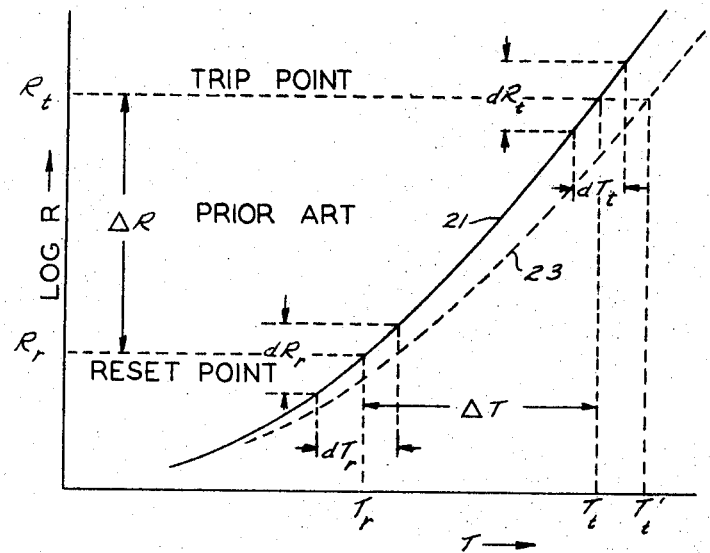

Referring now to FIG. 1, plotted there is the resistance vs. temperature (R vs. T) characteristic 21 of a thermistor of a prior art type heretofore used in temperature sensing applications. More specifically, the thermistor is represented as being of a semiconducting barium titanate ($BaTiO_3$) material exhibiting a nonlinear shallow-sloped positive temperature coefficient (PTC) of resistivity. Such thermistors have been utilized in various control applications, e.g., motor protection systems, wherein a control circuit is responsive to changes in the resistance of the thermistor and performs control functions such as the protective deenergization (tripping) and reenergization (resetting) of an electrical load such as a motor at control temperatures sensed by the thermistor. Typical trip and reset points are indicated.

Assuming the load to be a motor to which the thermistor graphically represented is thermally coupled, if the motor temperature sensed by the thermistor exceeds a trip temperature $T_t$, the resistance of the thermistor will exceed a corresponding value $R_t$ at which the control circuit will trip and thus deenergize the motor. When the motor has cooled sufficiently and its temperature thus falls below a reset temperature $T_r$, the thermistor resistance will fall below a value $R_r$ causing the control circuit to reset and thus reenergize the motor. The difference between the trip and reset temperatures is designated $\Delta T$. There is a corresponding difference $\Delta R$ between the trip and reset resistances of the thermistor.

Ideally, a control circuit employing a thermistor of the type graphically represented by FIG. 1 would respond to an exact trip resistance $R_t$ and an exact reset resistance $R_r$ which correspond to exact temperatures $T_t$ and $T_r$. In practice, this is not so. Typically, control circuits are subject to errors in the resistances at which they respond, whether due to circuit tolerances, miscalibration, supply voltage variations, temperature effects on the components thereof, or various other factors. In the hypothetical motor control circuit discussed above, these errors give rise to a range $dR_t$ of possible resistances at which tripping will occur and a range $dR_r$ of possible resistances at which resetting will occur. As a direct consequence of these possible variations in resistance, errors result in the temperatures at which these control functions occur. Thus there are undesirable corresponding ranges $dT_t$ and $dT_r$ of possible temperatures at which tripping and resetting may occur in the example hypothesized. The elimination of such errors in these control temperatures is possible only at the prohibitive expense of providing a control circuit with high precision. And, in any case, tailoring or matching of the control circuit to a particular sensor thermistor may be required to minimize these errors.

In motor protection applications, a further problem arises because of a shift in the R vs. T characteristic of a thermistor of the FIG. 1 type which occurs upon application of an electric field, resulting in a new or shifted R vs. T characteristic designated 23 in FIG. 1. Thus when the trip point resistance $R_t$ is reached, the trip temperature to which this resistance corresponds has a value $T_t'$ considerably greater than that value $T_t$ at which tripping is desired. Such field-induced error may be classified as a voltage sensitivity of the thermistor sensor.

Figure 2:
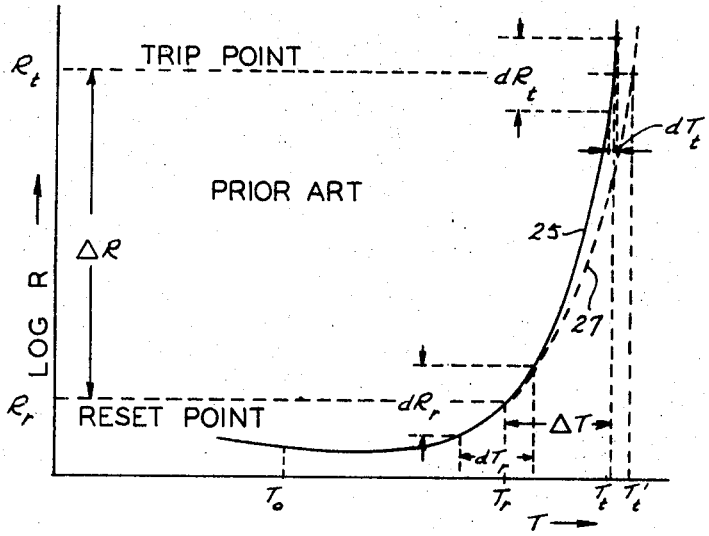
FIG. 2 is a graph, similar to FIG. 1, representing the resistance vs. temperature characteristic of another type of prior art thermistor sensor.

In order to alleviate or eliminate errors of the above-described types, the use of PTC thermistor materials having steeply-sloped R vs. T characteristics has been proposed. Such a characteristic, designated 25, is represented in FIG. 2 and, as may be seen, results in a greatly reduced range of error $dT_t$ in the trip temperature $T_t$ as well as a somewhat reduced range of error $dT_r$ in the reset temperature $T_r$, as is desired. Another advantage is that voltage sensitivity caused by the applied field is reduced by the steeply-sloped characteristic, as may be seen from the shifted characteristic 27 caused by this field. However, in order to obtain a significantly useful trip-reset differential $\Delta T$, it may be necessary in some cases to choose the reset temperature $T_r$ somewhat to the left of the "knee" or transition point of the characteristic at which it begins to slope steeply upward. If this is the case, for a particular range of error $dR_r$ of the reset temperature $R_r$ there may be an unduly large range of error $dT_r$ in the reset temperature $T_r$. Hence, this error $dT_r$ may in fact be larger than with shallow-sloped thermistor materials.

In order to overcome the last-mentioned problem and yet permit the use of steeply-sloped thermistor materials, it has been proposed to use thermal biasing in order to permit both the trip and reset temperatures $T_t$ and $T_r$ to intersect with steeply sloped portions of the thermistor R vs. T characteristic and thereby reduce the trip and reset temperature errors $dT_t$ and $dT_r$, thus permitting relaxed circuit tolerances. Such an approach is described in Buiting et al. U.S. Pat. No. 3,457,460, for example. However, one disadvantage of this thermal biasing approach is that specialized control and biasing circuitry is required.

Another application of steeply-sloped thermistor materials of the type characterized by FIG. 2 has been described, for example, in Obenhaus et al. U.S. Pat. application Ser. No. 822,901, filed May 8, 1969, entitled Electrothermal Furnace Control and issued on Dec. 22, 1970 as U.S. Pat. No. 3,549,088. Such an electrothermal timer is constituted by a pair of thermally coupled thermistors, one being employed as a sensor thermistor and the other being used in a self-heating mode as a heater for the first. In use, the operation of such an electrothermal timer may be interconnected with an ignition circuit such that, when ignition of the furnace fuel is called for to supply heat, the heater thermistor is energized and the ignition circuit concomitantly causes sparking. Initially, the sensor or heated thermistor is at some relatively low room temperature $T_o$. Upon heating by the heater thermistor, this heated thermistor increases in temperature until either ignition of the furnace fuel occurs or until, after a predetermined time interval, the trip point (defined by the resistance $R_t$ of the latter thermistor) is reached, causing sparking to cease. The heater thermistor is simultaneously deenergized. After a time interval during which the sensor thermistor cools until it has a resistance $R_r$ at the reset point, the ignition circuit and heater thermistor will be reenergized for a new ignition attempt.

While the resistance change $\Delta R$ from the trip point to the reset point is substantial, the corresponding change in temperature $\Delta T$ is quite small and thus represents only a short cooling time interval from tripping to resetting, which may be intolerable or undesirable. Thus the time during which the ignition circuit is deenergized may be too much less than the time during which the ignition circuit is energized than is desirable to permit purging of unburned fuel, etc. Similarly, the time required to heat the sensor thermistor from the reset point to the trip point for a new ignition attempt upon recycling may be too short to permit fuel ignition.

The present invention overcomes the various foregoing disadvantages in temperature sensing arrangements employing as discussed hereinabove, single prior art thermistors of the type characterized by FIGS. 1 and 2. In a general manner of speaking, the present invention entails the provision of composite thermistor temperature sensors characterized by step-function resistive response to changes in the temperature sensed thereby.

Figure 3:
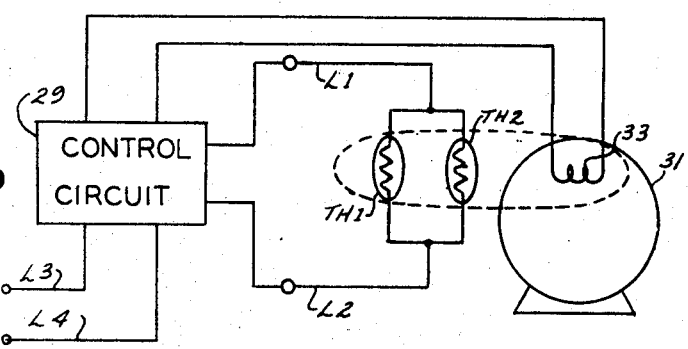
FIG. 3 is a circuit schematic diagram illustrating the interconnection with a control circuit of a composite thermistor sensor according to the present invention.

Referring now to FIG. 3, a composite thermistor sensor of the invention comprises a pair of thermistor elements TH1 and TH2 which are electrically interconnected in parallel-circuit relationship. This parallel pair of thermistor elements represents an equivalent resistance which is shown connected to a control circuit, indicated generally at 29, via a pair of leads L1 and L2. The control circuit is one of many different types of control circuits adapted to perform control functions, e.g., the switching on or off of a load in response to changes in a resistance. Such a control circuit is shown, for example, in Strachan U.S. Pat. application Ser. No. 787,644, filed Dec. 30, 1968, entitled Motor Protection Circuit and issued Mar. 9, 1971 as U.S. Pat. No. 3,569,781.

As illustrated, the control circuit 29 is adapted to be supplied with power from a suitable source by means of a pair of leads L3 and L4. In response to the resistance across leads L1 and L2, the control circuit 29 is adapted to control a motor 31 by energization and deenergization of a winding 33 of the motor. Loads other than motor 31 may, of course, be controlled by control circuit 29.

As is indicated by a dashed line, the thermistor elements TH1 and TH2 are thermally coupled to motor winding 33 so that the elements are adapted to be substantially identically thermally responsive to winding 33, this winding constituting a source of heat or body whose temperature is to be sensed or measured by the sensor which the thermistor elements TH1 and TH2 comprise. By this identical response is meant that, for any temperature of winding 33, each of the elements TH1 and TH2 will be at substantially the same temperature. It follows that, as long as this is true, the elements may be physically displaced from one another if necessary though remaining interconnected. As an example, the elements may be individually buried in the motor windings but together constitute a composite sensor.

Each of the thermistor elements TH1 and TH2 is of the type of thermistor material having a positive temperature coefficient (PTC) of resistivity and a well-defined transition temperature, i.e., the so-called Curie temperature, above which its resistance rises relatively abruptly with a steeply sloped characteristic and below which its resistance changes relatively little. Such a material which has been employed in making thermistors is semiconducting barium titanate ($BaTiO_3$) having excess titanium dioxide ($TiO_2$) and doped with lanthanum (La) or antimony (Sb). It will become more clearly understood from the discussion hereinbelow that the transition temperature of one of the thermistor elements, e.g., TH2, is chosen to be substantially greater than that of the other thermistor element. As will be understood by those having skill in the art, thermistor elements TH1 and TH2 may take any of various forms, e.g., small "pills" having metalized areas defining contacts to which leads may be attached.

In addition to having different transition temperatures, thermistor elements TH1 and TH2 are chosen, for this embodiment, so that the element (e.g., TH2) having the higher transition temperature has a resistance at its transition temperature which is substantially greater than the resistance of the other element (TH1) at the transition temperature thereof. Referring to FIG. 6, indicated at 35 is the R vs. T characteristic of thermistor element TH1, its transition temperature being $T_{TR1}$. Indicated at 37 is the R vs. T characteristic of thermistor element TH2, its transition temperature being $T_{TR2}$. As may be seen, the resistance of element TH2 at its transition temperature $T_{TR2}$ has a value $R_{TR2}$ substantially greater than the corresponding resistance $R_{TR1}$ of element TH1 at its transition temperature $T_{TR1}$.

Since elements TH1 and TH2 are connected in parallel-circuit relationship, the resistance of the sensor is a parallel-equivalent resistance and is represented by the dashed-line R vs. T characteristic 39 in FIG. 6. As may be seen, the sensor characteristic 39 has a relatively low resistance for temperatures below the transition temperature $T_{TR1}$ of element TH1, but increases relatively abruptly at the transition temperature $T_{TR1}$ of element TH1, then levels off somewhat to form a step-like portion of the curve, then increases abruptly once more at the transition temperature $T_{TR2}$ of element TH2.

The sensor thus described is well suited for motor control applications or for controlling similar heat-generating loads where it is desired to trip or deenergize motor 31 if the temperature of winding 33 exceeds a trip threshold and to reset or reenergize the motor when the temperature winding 33 falls below a reset threshold. Typical trip and reset temperatures $T_t$ and $T_r$ and corresponding sensor trip and reset resistances $R_t$ and $R_r$ are shown in FIG. 6. As may be seen, a small change in temperature of the sensor thermistor elements TH1 and TH2 at the trip and reset points results in a large change in resistance. Thus the ranges $dT_t$ and $dT_r$ of temperature errors for corresponding resistance errors $dR_t$ and $dR_r$ are small. Conversely, since the ratios of $dR_t/dT_t$ and $dR_r/dT_r$ are relatively large, the trip and reset functions are not greatly dependent upon control circuit tolerances. The control circuit may therefore have quite a loose tolerance in its response to sensor resistances without resulting in appreciable change in trip and reset temperatures, as is highly desirable. Further, the difference between trip and reset temperatures $T_t$ and $T_r$ may be considerable, if desired, since it is the transition temperatures $T_{TR1}$ and $T_{TR2}$ of elements TH1 and TH2 which determine the areas of abrupt change in resistance of the sensor characteristic 39. It is therefore the sensor, rather than the control circuit, which determines the trip and reset points, i.e., those temperatures at which these control functions are carried out. Consequently, no critical tailoring of the control circuit to the sensor is required.

FIG. 4 illustrates an embodiment of a sensor of the invention also having thermistor elements TH1 and TH2 connected in parallel-circuit relationship but including, in addition, a substantially temperature-insensitive calibration resistance, e.g., a resistor R1, series-connected with one of the elements, viz., element TH2, the other element TH1 thus being connected across the series-connected element TH1 and resistor R1. Resistor R1 may be a manually variable resistor, as indicated, but does not vary substantially with respect to changes in the temperature sensed by the sensor. Thermistor elements TH1 and TH2 are, as previously noted, adapted to be substantially identically thermally responsive to a body whose temperature is sensed by the sensor.

Figure 7:
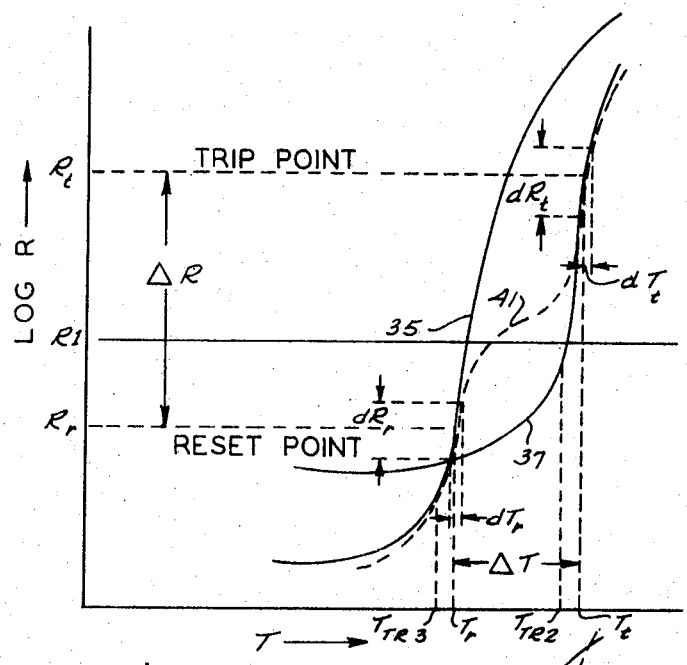
FIG. 7 is a graph similar to FIG. 6 but showing characteristics of elements and the equivalent characteristic of the sensor of FIG. 4.

The function of resistor R1 is one of calibration which may be understood by referring to FIG. 7, wherein the R vs. T characteristics 35 and 37 of the individual elements TH1 and TH2 are plotted as before. Resistor R1 is represented as having a temperature-invariable value R1. The equivalent R vs. T characteristic of the sensor is indicated at 41. As may be seen, resistor R1 has the effect of shifting the "step" of the sensor R vs. T characteristic upward from the position shown in FIG. 6, desirably resulting in an even more sharply defined step response and permitting even more latitude in control circuit tolerances, since, as may clearly be seen, the range $dT_r$ of reset temperature error corresponding to a range $dR_r$ of control circuit resistance reset error is indeed small. The range $dT_t$ of trip temperature error is, as in FIG. 6, also quite small.

Figure 10:
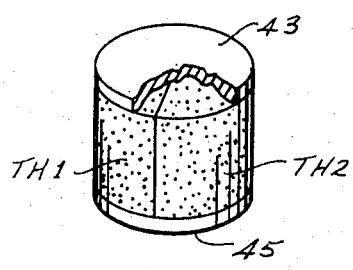
FIG. 10 is a perspective of a first type of parallel-connected composite thermistor sensor.
Figure 11:
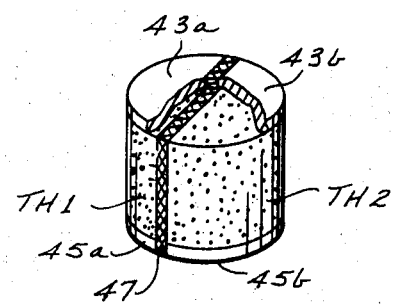
FIG. 11 is a perspective of an alternative embodiment of the composite thermistor sensor of FIG. 10.
Figure 12:
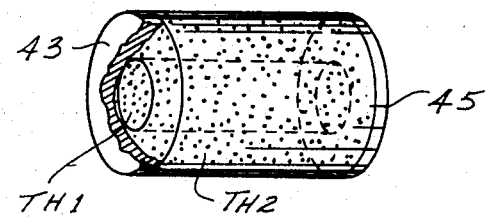
FIG. 12 is a perspective of another embodiment of a composite sensor similar to the sensors of FIGS. 10 and 11 employing parallel-connected thermistor elements.

FIGS. 10-12 show composite sensors of the invention which provide for interconnection of the individual thermistor elements in parallel circuit relationship. In FIG. 10, thermistor elements TH1 and TH2 symbolically represented in FIG. 4 are shown as each being of complementary semicylindrical form and each having a flat axial face in a diametrical plane. Thus when joined face-to-face, the sensor is cylindrical in form. The semicylindrical elements may be suitably secured together over the axial faces. Metallic contacts 43 and 45 are provided at the opposite ends of the cylindrical sensor permitting the attachment of leads for interconnection in a control circuit, as by soldering or welding. Thus it may be seen that the elements TH1 and TH2 are intrinsically parallel-connected. Contact 43 is shown partly broken away to illustrate the face-to-face configuration of elements TH1 and TH2. Contacts 43,45 may be provided by suitable known methods, e.g., by metalizing the thermistor elements through an electroless plating process. The elements TH1 and TH2 may be cut from blocks of thermistor material or extruded, etc.

If a resistance is to be connected in series with one of the thermistor elements, the embodiment of FIG. 11 may be employed. Rather than being joined in face-to-face relationship throughout their lengths, the semicylindrical elements, as well as the end contacts 43 and 45, may be separated by a thin layer of electrically insulated material, e.g., Mylar. Again, contact 43 is shown partly broken away. The two semi-cylindrical halves may be suitably joined together, as by cementing. Since each of the elements TH1 and TH2 has its own separate insulated end contacts 43a, 45a, and 43b, 45b, respectively, electrical connection may be as desired, permitting the type of sensor circuit of FIG. 4.

FIG. 12 is illustrative of another embodiment of a composite sensor of the invention useful for connection as in FIG. 3. Element TH1 is represented as being cylindrical in form. Element TH2 is of tubular form having an axial bore, with element TH1 filling this bore. Suitable metallic contacts 43 and 45 bridge the respective opposite ends of elements TH1 and TH2 as in the embodiment of FIG. 10 so that these elements are then connected in parallel. Contact 43 is shown partly broken away in order to illustrate the concentric positioning of element TH1 within element TH2. This form of the sensor is particularly well-suited for manufacture by coextrusion of the two different thermistor materials which comprise elements TH1 and TH2. If desired, of course, an insulating sleeve analogous to insulating layer 47 in FIG. 11 may be placed between the elements TH1 and TH2 with separate contacts being provided for the ends of the elements. As will appear, this latter type of arrangement with insulated elements as well as the similarly insulated embodiment of FIG. 11 may also be employed in constructing a sensor of the invention having the elements connected in a series circuit rather than a parallel circuit.

The connection of thermistor elements of a sensor of the invention in a series circuit, as represented in FIG. 5, provides certain distinct advantages and involves considerations somewhat different from the previously explained parallel arrangements. Referring to FIG. 5, thermistor elements TH3 and TH4 are connected in series-circuit relationship. As in the previously described sensors having parallel-connected thermistor elements, thermistor elements TH3 and TH4 are each of the type of PTC thermistor material having a well-defined transition temperature above which the resistance thereof rises relatively abruptly and below which changes relatively little. The R vs. T characteristics of elements TH3 and TH4 are indicated in the graph of FIG. 8 at 48 and 49, respectively. As may be seen, the transition temperature $T_{TR4}$ of element TH4 is chosen to be substantially greater than the transition temperature $T_{TR3}$ of element TH3.

Parallel-connected with element TH3 is a substantially temperature-insensitive calibration resistance, e.g., a resistor R2 (which may be manually variable). Thus its value, represented as R2 in FIG. 8, does not vary substantially with respect to changes in the temperature sensed by the sensor. This value R2 is chosen to be greater than the resistance of element TH4 at its transition temperature $T_{TR4}$, although in FIG. 8 this value is indicated as being substantially greater than the value of either of the elements at their transition temperatures.

As in the previously described parallel-connected composite sensors, each of thermistor elements TH3 and TH4 of the series-connected sensor of FIG. 5 is adapted to be substantially identically thermally responsive to a source of heat. Such a heat source is represented as a thermistor element TH5 which is adapted, when energized, to self-heat to a predetermined temperature. Such self-heating thermistors are of the type employed in constructing electrothermal timers of the type described in said U.S. Pat. No. 3,549,088, 3,549,088 for Electrothermal Furnace Control, and typically also are of the type of thermistor material employed for elements TH3 and TH4. Thermal coupling of elements TH3 and TH4 to this self-heating element TH5 is indicated by dashed lines. Thus this particular sensor is particularly useful in an electrothermal timing control application and, when so used, the resistance of the sensor appears across a pair of leads L5 and L6 interconnecting the sensor with a furnace control of the above type.

The sensor equivalent resistance across leads L5 and L6 follows the R vs. T characteristic indicated at 51 in FIG. 8. The advantages of such an arrangement over prior art electrothermal timers as discussed hereinabove become apparent when one considers a furnace ignition control application involving the use of an electrothermal timer with a sensor of this invention. Initially, all components of the timer, and thus elements TH3 and TH4, are at a relatively low room temperature $T_o$. Upon energization of heater element TH5 by means of a pair of leads L7 and L8, heating of elements TH3 and TH4 is initiated. Concomitantly, an ignition circuit is energized for causing sparking or the like to ignite fuel supplied to the furnace. If ignition occurs, the heater element TH5 and ignition circuit are deenergized. If ignition does not occur, continued heating of the sensor takes place until, after a predetermined time interval and at a trip temperature $T_t$, a trip point is reached when the sensor resistance reaches a trip value $R_t$ causing deenergization of element TH5. The sensor thus cools to a reset temperature $T_r$ until its resistance drops to a reset value $R_r$. At this reset point, the heater element TH5 is reenergized for a new ignition attempt. Since the difference between the initial (room) temperature $T_o$ and the trip temperature $T_t$ is not very much greater than the difference $\Delta T$ between the trip temperature $T_t$ and the reset temperature $T_r$, the time intervals for the original and recycling ignition attempts are not greatly different, at least as compared with prior art electrothermal ignition timers. This is desirable, as those skilled in the art will realize. The above sensor also has the same desirable reduction in errors as the previously described composite sensors of the invention in the temperatures at which the tripping and resetting control functions are carried out, since, as may be seen, the composite sensor characteristic is quite steeply sloped at the trip and reset points.

Figure 9:
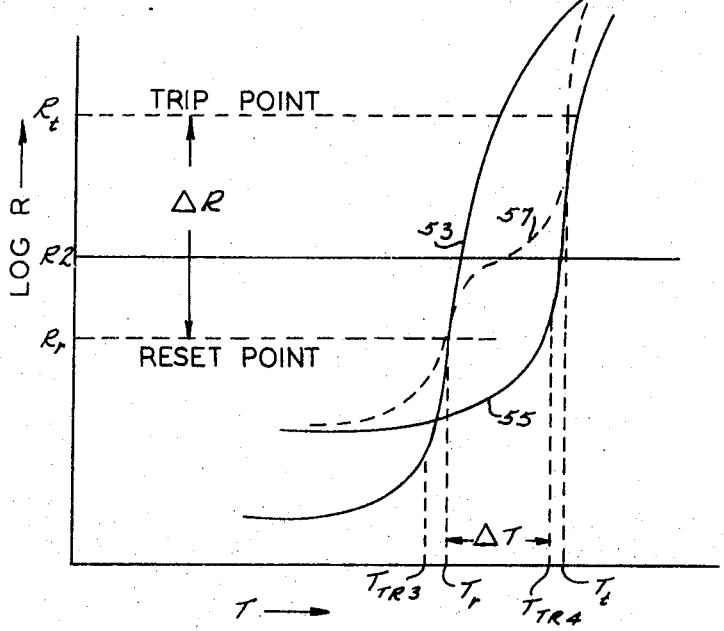
FIG. 9 is a graph similar to FIG. 8 but showing different thermistor element characteristics.

FIG. 9 illustrates the R vs. T curves for the thermistor elements series-connected as in FIG. 5 and the R vs. T curve for the composite sensor resistance when the elements have characteristics like those in FIGS. 6 and 7. Thermistor element TH3 has an R vs. T characteristic 53 and element TH4 has a similar characteristic 55. The resistance R2 across element TH3 has a value indicated at R2. The resulting composite sensor characteristic 57 is not greatly different from the characteristic 41 shown in FIG. 7 for a parallel-connected sensor except for temperatures below the reset temperature $T_r$ and above the trip temperature $T_t$ as is quite clearly apparent from FIG. 9.

Figure 13:
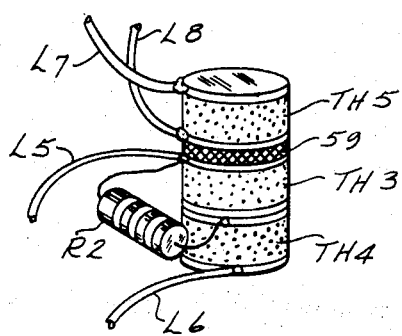
FIG. 13 is a perspective of a composite sensor having a series-connected arrangement of thermistors constituting the circuit of FIG. 5.

A physical embodiment of the series-connected sensor of FIG. 5 is depicted in FIG. 13. Thermistor elements TH3 and TH4 are shown as being small pill-like elements having cylindrical cross-section or form and having generally transverse coplanar ends with metallic contacts across each end like the contacts 43 and 45 of the FIG. 10 construction. The elements TH3 and TH4 are welded or soldered, etc., in end-to-end series-connected relationship, the leads L5 and L6 being suitably attached to the outermost metallic contacts. The calibration resistance across element TH3 is represented as a resistor R2 simply connected to the contacts of this element. A rheostat or adjustable resistor may instead be used. The thermistor heating element TH5 is shown as being physically similar to elements TH3 and TH4 and includes similar metallic contacts across its ends to which leads L7 and L8 are attached. A layer 59 of insulating material separates sensor element TH3 from heater element TH5, these elements and layer 59 being suitably secured together, as by cementing. While sensor element TH4 is somewhat more distant from heater element TH5 than is element TH3, these two elements TH3 and TH4 exhibit substantially identical thermal response to heating by element TH5 because of the small size and low mass of the typically pill-sized elements, as will be recognized by those familiar with such thermistor elements. Of course, if desired, the heater element may be positioned between elements TH3 and TH4.

Examples of composite sensors according to the present disclosure of both parallel- and series-connected elements have been found to exhibit characteristics as disclosed herein. The following examples further illustrate the invention:

EXAMPLE 1

A composite sensor having parallel-connected thermistor elements as in FIG. 4 exhibiting an equivalent R vs. T characteristic similar to that of FIG. 7 was constituted by a first thermistor element (TH1 in FIG. 4) of semiconducting barium-strontium titanate ($BaSrTiO_3$) having excess titanium dioxide ($TiO_2$) of 1.2 molar percent, doped with 0.2 molar percent lanthanum (La) and having 40 parts per million iron (Fe) and exhibiting a resistance of approximately 250 ohms at a transition temperature of 80° C. Connected in a circuit across the first element (TH1) was a second thermistor element (TH2) of semiconducting barium titanate having excess titanium dioxide of 2.0 molar percent, doped with 0.2 molar percent lanthanum, exhibiting a resistance of approximately 2,600 ohms at a transition temperature of 120° C. A substantially temperature-insensitive resistance (R1) of approximately 3,000 ohms was connected in series with the latter element.

EXAMPLE 2

A composite sensor having series-connected thermistor elements as in FIG. 5 and exhibiting an equivalent R vs. T characteristic similar to that in FIG. 9 was constituted by a first thermistor (TH3) element of semiconducting barium-strontium titanate having excess titanium dioxide of 1.2 molar percent, doped with 0.2 molar percent lanthanum, and having 40 parts per million iron, and exhibiting a resistance of approximately 250 ohms at a transition temperature of 80° C. Connected thereacross was a substantially temperature-invariable resistance (R2) of approximately 3,000 ohms. In series with these components was a second thermistor element (TH4) of semiconducting barium titanate having 2.0 molar percent excess titanium dioxide, doped with 0.2 molar percent lanthanum, having 30 parts per million iron, and a resistance of approximately 950 ohms at a transition temperature of 120° C.

While each of the two general types of composite sensors disclosed hereinabove has been described as having but two thermistor elements, it will be appreciated by those having skill in the design and use of thermistors that composite sensors of the invention may be made with more than two elements in both series-and parallel-connected arrangements to achieve a step-function sensor response with two or more well-defined steps. As will be apparent, each of the thermistor elements of such a composite sensor will have a different transition temperature. Further, such sensors may include temperature-insensitive calibration resistances with the thermistor elements, as in FIGS. 4 and 5, in order to control or calibrate the level of each "step."

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temperature sensor for use in a control circuit adapted to perform first and second control functions in response to changes in the resistance of said sensor at respective first and second control temperatures determined by said sensor, said sensor comprising a first thermistor element having a positive temperature coefficient and a well-defined transition temperature above which the resistance thereof rises relatively abruptly and below which the resistance thereof changes relatively little; and a second thermistor element having a positive temperature coefficient and a well-defined transition temperature, substantially greater than that of said first element, above which the resistance of said second element rises relatively abruptly and below which the resistance thereof changes relatively little; the resistance of said second element at the transition temperature thereof being substantially greater than the resistance of said first element at the transition temperature thereof; said first and second elements being substantially identically thermally responsive to a source of heat and being electrically interconnected in parallel-circuit relationship whereby the sensor resistance is a parallel- equivalent resistance which varies as a function of the resistances of said elements and changes relatively abruptly at said control temperatures, said control temperatures being determined by the transition temperatures of said elements.

2. A temperature sensor as set forth in claim 1 further comprising a substantially temperature-insensitive resistance which does not vary substantially with respect to changes in the temperature sensed by said sensor, said temperature-insensitive resistance being series-connected with one of said elements, the other of said elements being connected across the series-connected one element and temperature-insensitive resistance.

3. A temperature sensor as set forth in claim 2, wherein said temperature-insensitive resistance is series-connected with said second element.

4. A temperature sensor comprising first and second thermistor elements each constituted by thermistor material having a well-defined transition temperature above which the resistance thereof changes relatively abruptly and below which the resistance thereof changes relatively little, the transition temperature of said second element being substantially greater than that of said first element, the resistance of said second element at the transition temperature thereof being substantially greater than the resistance of said first element at the transition temperature thereof, each of said elements having opposite ends and having respective surfaces, said elements being secured together in face-to-face relationship at said surfaces, and electrical contact means at the opposite ends of said elements adapted to be interconnected in an electrical circuit.

5. A temperature sensor comprising first and second thermistor elements each constituted by thermistor material having a well-defined transition temperature above which the resistance thereof changes relatively abruptly and below which the resistance thereof changes relatively little, the transition temperatures of the first and second elements being substantially different from one another, the resistance of said second element at the transition temperature thereof being substantially greater than the resistance of said first element at the transition temperature thereof, each of said elements having opposite ends and having respective surfaces, said elements being secured together in face-to-face relationship at said surfaces, electrical contact means at the opposite ends of said elements, said elements electrically connected in parallel by metallic areas bridging respective opposite end portions of said elements and adapted to be interconnected in an electrical circuit.

6. A temperature sensor comprising first and second thermistor elements each constituted by thermistor material having a well-defined transition temperature above which the resistance thereof changes relatively abruptly and below which the resistance thereof changes relatively little, the transition temperatures of the first and second elements being substantially different from one another, each of said elements having opposite ends and having respective surfaces, said elements being secured together in face-to-face relationship at said surfaces, each element being of semicylindrical form thus having a flat axial face in a diametrical plane with said first and second ends being of semicircular form and normal to said axial face, said elements being joined together over the said axial faces thereof and electrical contact means at the opposite ends of said elements adapted to be interconnected in an electrical circuit.

7. A temperature sensor comprising first and second thermistor elements each constituted by thermistor material having a well-defined transition temperature above which the resistance thereof changes relatively abruptly and below which the resistance thereof changes relatively little, the transition temperatures of the first and second elements being substantially different from one another, each of said elements having opposite ends and having respective surfaces, said elements being secured together in face-to-face relationship at said surfaces, the first element is of tubular form thus having an axial bore, and the second element fills the bore and electrical contact means at the opposite ends of said elements adapted to be interconnected in an electrical circuit.

* * * * *